United States Patent [19]

Hanson et al.

[11] Patent Number: 5,067,113
[45] Date of Patent: Nov. 19, 1991

[54] EFFICIENT GENERATION OF TRAVELTIME TABLES FOR TWO DIMENSIONAL AND THREE DIMENSIONAL PRESTACK DEPTH MIGRATION

[75] Inventors: Douglas W. Hanson; Shein S. Wang; William S. Harlan, all of Ponca City, Okla.

[73] Assignee: Conoco Inc., Ponca City, Okla.

[21] Appl. No.: 606,378

[22] Filed: Oct. 30, 1990

[51] Int. Cl.$^5$ .......................... G01V 1/28; G01V 1/30
[52] U.S. Cl. ........................................ 367/50; 367/73
[58] Field of Search ...................... 367/50, 51, 53, 73, 367/38; 364/421

[56] References Cited

U.S. PATENT DOCUMENTS

| | | | |
|---|---|---|---|
| 4,839,869 | 6/1989 | Corcoran | 367/53 |
| 4,953,140 | 8/1990 | Dablain | 367/73 |
| 4,964,088 | 10/1990 | Chittineni | 367/51 |
| 4,964,103 | 10/1990 | Johnson | 367/53 |

*Primary Examiner*—Ian J. Lobo

[57] ABSTRACT

A method for rapidly and efficiently generating traveltime tables for application in depth migration initially includes receiving a velocity model which may include a plurality of velocities in multiple layers between various subsurface reflectors. The model is plotted on a two dimensional grid with the subsurface reflectors identified. A traveltime to the first reflector is determined. Traveltimes from the sources on each layer boundary to all grid points above the next reflector are determined. For the initial iteration, the layer boundary is the surface and the source is the actual source used in shooting the line. For layers below the surface there will be more than one source or secondary source. The actual determination of traveltimes for these lower layers may be done by comparing the traveltimes to all points on the first reflector. The minimum traveltime is selected as the true traveltime to the first reflector. Next, all points where the reflector intersects the grid are found. Using these intersection points, the traveltimes to the second reflector may be generated in a similar manner, determining traveltimes from a predetermined point on the reflector to the second reflector.

9 Claims, 3 Drawing Sheets

EFFICIENT GENERATION OF TRAVELTIME TABLES FOR TWO DIMENSIONAL AND THREE DIMENSIONAL PRESTACK DEPTH MIGRATION

BACKGROUND OF THE INVENTION

1. Field of the Invention

The present invention relates to determining traveltimes for seismic pulses and more particularly to generating source and receiver traveltime tables very efficiently so that two dimensional and three dimensional prestack depth migration can be economically performed.

2. Related Prior Art

Prior art has illustrated many ways for producing traveltime tables. Traveltime tables are usually generated by shooting a fan of rays and interpolating between the rays. There were problems with critical angles. Also the method is more difficult to apply in three dimensional work.

The source and receiver traveltime tables are generated at present by shooting a fan of rays and the traveltimes are obtained by recording the traveltimes along the ray-path. The complete traveltime table is then obtained by interpolation. This method can provide traveltimes for any depth point (x,z). A prior art example of this type of ray tracing to obtain traveltime tables is illustrated in the following United States Patent.

U.S. Pat. No. 4,839,869, "Methods for Processing Converted Wave Seismic Data", issued to Chris T. Corcoran, relates to methods for processing converted wave seismic data which includes, fractional point gathering of the data in a manner consistent with a selected velocity model, dynamic correction of the data using parameters measured from the data to account for the asymmetric travel path of the converted wave rays and stacking the dynamically corrected data. Methods are also provided for updating the velocity model.

SUMMARY OF THE INVENTION

The present invention provides a method for rapidly and efficiently generating traveltime tables for application in depth migration. Initially, a velocity model is received which may include a plurality of velocities in multiple layers between various subsurface reflectors. The model is plotted on a two dimensional grid with the subsurface reflectors identified. Traveltimes from the sources on each layer boundary to all grid points above the next reflector are determined. For the initial iteration, the layer boundary is the surface and the source is the actual source used in shooting the line. As such, there is only one travel time to each grid point. For layers below the surface, i.e. areas between reflectors, there will be more than one source or secondary source. The actual determination of traveltimes for these lower layers may be done by comparing the traveltimes to all points on the first reflector. The minimum traveltime is selected as the true traveltime to the first reflector. Next, all points where the reflector intersects the grid are found and the traveltimes from the source to these points are determined. Using each of these intersection points as new sources, the traveltimes to the next reflector may be generated in a similar manner, determining traveltimes from a predetermined points, grid intersection points, on the reflector to the subsequent reflector.

DESCRIPTION OF THE PREFERRED EMBODIMENT

The source and receiver traveltime tables are generated at present by shooting a fan of rays and the traveltimes are obtained by recording the traveltimes along the ray-path. The complete traveltime table is then obtained by interpolation. This method can provide traveltimes for any depth point (x,z). Since for depth migration the traveltimes are needed only on a regular grid of points, we can generate them more efficiently by the following method.

Figure 1:
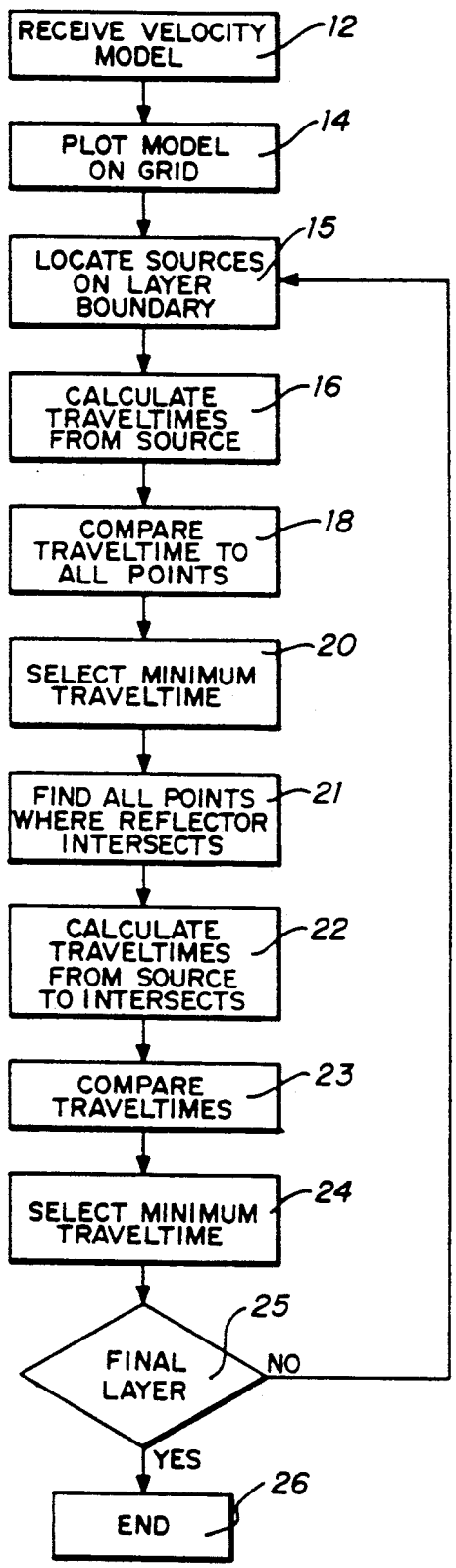
FIG. 1 is a flow chart in block form illustrating the method of the present invention.
Figure 2:
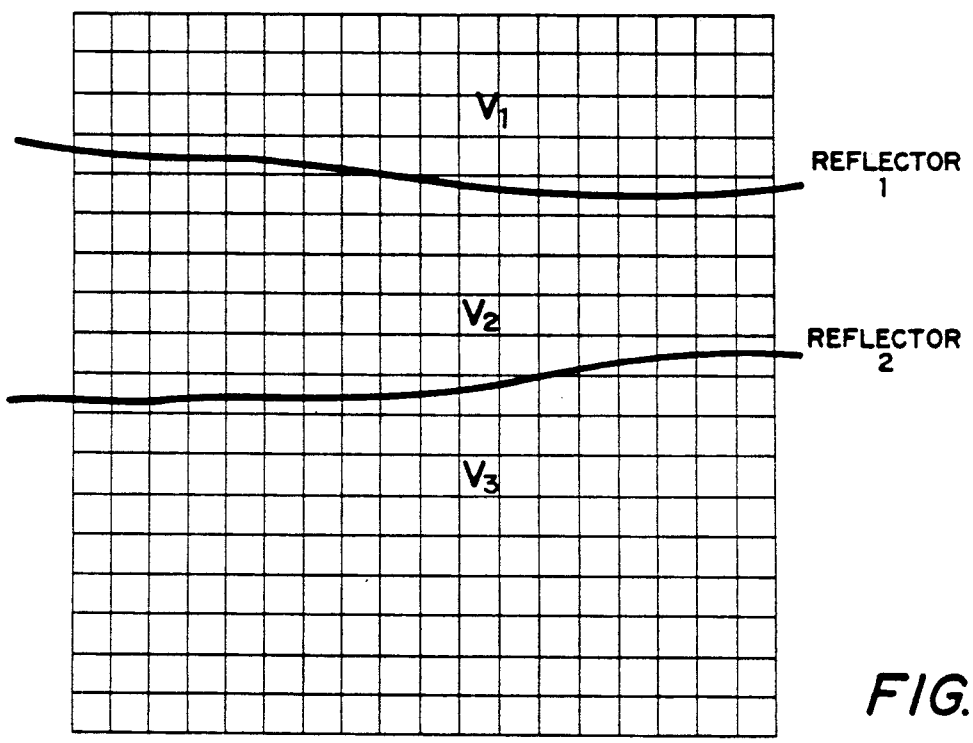
FIG. 2 is a graphical representation of a velocity model having several reflectors plotted on a grid.

Referring now to Figure 1, a block diagram of the method of the present invention is illustrated. At the first block, block 12, data is received as a velocity model. This model may take any form that is currently in use in the art. At block 14 the velocity model is plotted on a grid type of format. FIG. 2 illustrates a two dimensional velocity model with three layers overlaid on a grid having horizontal spacing of $\Delta x$ and vertical spacing of $\Delta z$.

Figure 3:
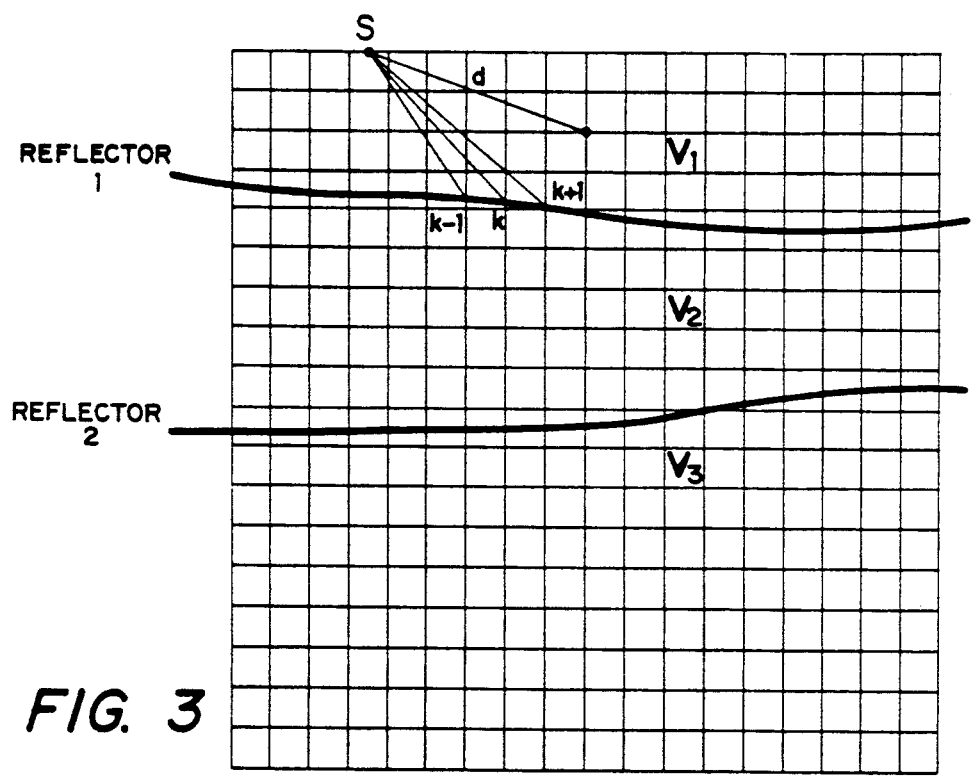
FIG. 3 is a graphical representation of a gridded velocity model indicating a surface source location and traveltimes to a first layer.
Figure 4:
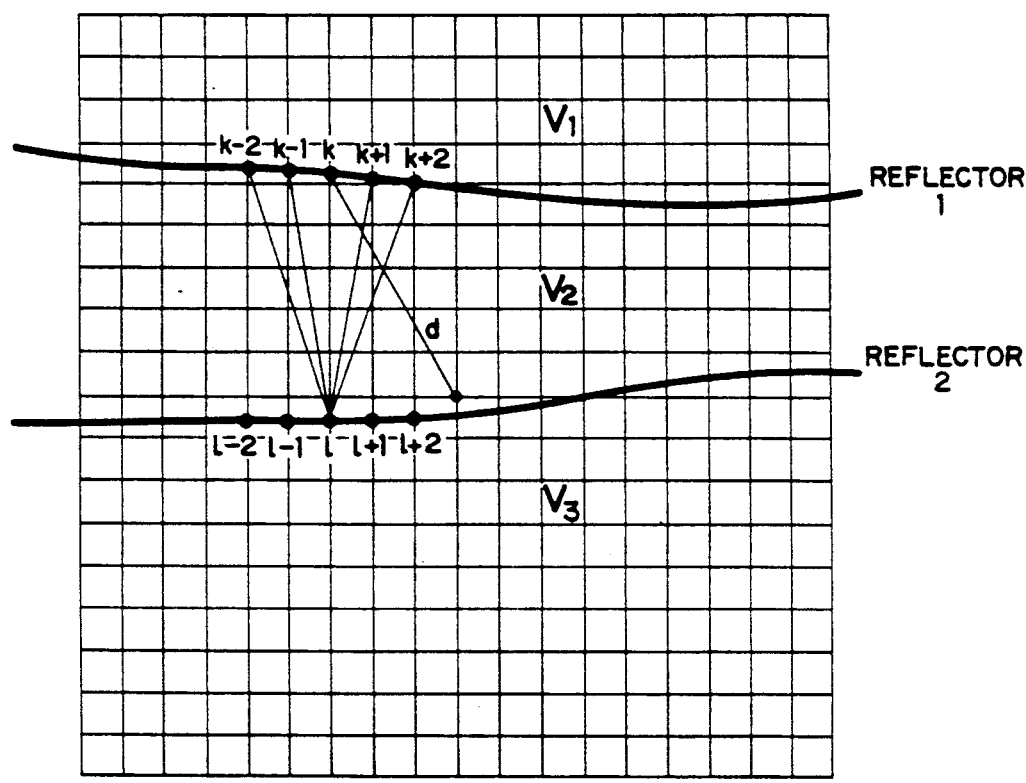
FIG. 4 is an graphical representation of a gridded velocity model indicating a plurality of secondary source locations with raypaths to a single grid point.

At block 15 all the secondary sources on the layer boundary are located. As illustrated in FIG. 3, there is only one source point S for the top layer boundary or the surface. For deeper layers, between subsurface reflectors, locations of all the secondary sources k, k+1, k−1, etc. located on the first subsurface reflector, are illustrated in FIG. 4.

At block 16 the traveltimes from each preselected point through a layer to all points above a reflector are calculated. In the first iteration of the present invention the only preselected point is the position of a source which has been illustrated. The layer in question is the first layer, the layer between the surface and reflector 1.

In block 18 the traveltime to all points above reflector 1 through the first layer from the preselected source are compared. At block 20 the minimum traveltime is selected.

At block 21 all points where the reflector of interest intersects with the vertical grid are found. In the first iteration the reflector of interest is the reflector 1. The points of intersection are used as secondary source points from which traveltimes through the next layer to the next reflector can be calculated.

At block 22 the traveltimes from each preselected point through a layer to all vertical intersections on a reflector are calculated. In the first iteration of the present invention the only preselected point is the position of a source which has been illustrated. The layer in question is the first layer, the layer between the surface and reflector 1.

In block 23 the traveltime to all vertical intersections on reflector 1 through the first layer from the preselected source are compared. At block 24 the minimum traveltime is selected.

Block 25 is a decision block where it is determined whether additional reflectors exist and whether the layer is the final layer. If it is, the program proceeds to block 26 where the process ends. If it is not the final layer, the program returns to block 15 where the procedure is repeated.

In the second iteration the preselected points are the secondary source points k, k+1, k−1, etc. determined in the first iteration, the reflector of interest is reflector 2 and the traveltime is calculated through the second layer. In each iteration the preselected points are the secondary source points determined in the previous iteration and the reflector of interest is the next succeeding reflector through the next layer. For example, secondary sources 1, 1+1, 1−1 etc. are illustrated in FIG. 4 on reflector 2.

FIG. 2 shows a velocity model with three layers overlaid on a grid of points. The horizontal spacing is $\Delta x$ and the vertical spacing is $\Delta z$.

In FIG. 3, S is the source/receiver location. The traveltime (t(x,z) from S to any point (x,z) in the first layer can be calculated by $$t(x,z) = d(x,z) / v$$

where d is the distance from S to (x,z) and v is the average velocity between the S and (x,z).

All the points k where the first reflector intersects with the vertical grid can be found. The traveltime t(l,k) from S to any such point k are calculated by the same formula. These will be used to generate the traveltimes for the next layer, as follows.

FIG. 4 illustrates a plurality of secondary sources located on the first reflector having indications of traveltimes to a single grid point. Each of the secondary sources will provide a traveltime from the first reflector to each grid point and to each point on reflector two which intersects a vertical grid line. In this manner, traveltimes from a surface source to a first reflector and then to a second reflector may be added together to obtain the traveltime from a source located on the surface to the second reflector. Similarly, the process may be repeated for a third reflector, fourth reflector, etc.

In FIG. 4, the traveltime t(x,z) from S to any point (x,z) in the second layer can be calculated by $$t(x,z) = \min\ [t(l,k) + d(x,z) / v\ ],\ k = l, n$$

where d is the distance from point k to (x,z) and v is the average velocity between point k and x,z).

In other words, the traveltime is computed by comparing the time to all points on reflector 1, the first layer, and accepting the minimum traveltime. In practice, the accuracy is improved by fitting a traveltime curve to all the values and the minimum value along this curve is accepted.

By the same method, the traveltime to all points k of the next reflector can be computed, and these will allow us to compute the traveltimes to all points within the third layer.

Thus the traveltime from S to points within all the layers are calculated in order. Usually after the traveltime to the first point in each layer is calculated, the minimum point k is used to start the search for the next point. This will allow us to quickly find the minimum for the second point as well as for all other points in the same layer.

While there has been illustrated and described a particular embodiment of the present invention which has been limited to two dimensions, it will be appreciated that numerous changes and modifications will occur to those skilled in the art, particularly an extension of the present invention to three dimensions, and it is intended in the appended claims to cover all those changes and modifications which fall within the true spirit and scope of the present invention.

What is claimed is:

1. A method for generating traveltimes for traveltime tables for application in depth migration comprising the steps of:
   receiving a velocity model including a plurality of velocities in multiple layers between various subsurface reflectors;
   plotting the model on a two dimensional grid with the subsurface reflectors identified; and
   determining a traveltime to each grid point and each point on a first reflector that intersects a vertical grid line.

2. The method according to claim 1 also including the steps of:
   identifying all points where the first reflector intersects the grid; and
   generating the traveltimes to a second reflector using the intersection points on the first reflector as secondary sources and determining traveltimes from said reflection points on the first reflector to a second reflector.

3. The method according to claim 2 wherein said step of generating traveltimes to a second reflector includes the steps of:
   comparing the traveltimes to all points on the second reflector that intersect a vertical grid line from each secondary source; and
   selecting the minimum traveltime from said secondary sources to each intersection point as the true traveltime from the first reflector.

4. The method according to claim 3 also including the steps of:
   identifying all points where the second reflector intersects the grid; and
   generating the traveltimes to a third reflector using the intersection points on the second reflector as secondary sources and determining traveltimes from said reflection points on the second reflector to a third reflector.

5. The method according to claim 4 wherein said step of generating traveltimes to a third reflector includes the steps of:
   comparing the traveltimes to all points on the third reflector that intersect a vertical grid line from each secondary source on said second reflector; and
   selecting the minimum traveltime from said secondary sources on said second reflector to each intersection point as the true traveltime from the second reflector.

6. A method for generating traveltime tables for application in depth migration comprising the steps of:
   receiving a velocity model including a plurality of velocities in multiple layers between various subsurface reflectors;
   plotting the model on a two dimensional grid with the subsurface reflectors identified;
   determining traveltimes to a first reflector from a preselected source point by comparing the traveltimes to all points on the first reflector from the preselected source and selecting the minimum traveltime as the true traveltime to the first reflector;

finding all points where the reflector intersects the grid; and providing a traveltime table based on said minimum traveltime.

7. The method according to claim 6 also including the steps of:

generating traveltimes to a second reflector in a similar manner, using the intersection points of the reflector and determining traveltimes from said intersection points on the first reflector to a second reflector.

8. The method according to claim 7 wherein said step of generating traveltimes to a second reflector includes the steps of:

comparing the traveltimes to all points on the second reflector from a preselected intersection point; and selecting the minimum traveltime as the true traveltime to the second reflector.

9. A method for generating traveltimes through multiple layers for traveltime tables for application in depth migration comprising the steps of:

receiving a velocity model including a plurality of velocities in multiple layers between various subsurface reflectors;

plotting the model on a two dimensional grid with the subsurface reflectors identified;

determining a traveltime to each grid point and each point on a first reflector that intersects a vertical grid line;

identifying all points where the first reflector intersects the grid;

generating the traveltimes to a second reflector using the intersection points on the first reflector as secondary sources and determining traveltimes from said reflection points on the first reflector to a second reflector by comparing the traveltimes to all points on the second reflector that intersect a vertical grid line from each secondary source and selecting the minimum traveltime from said secondary sources to each intersection point as the true traveltime from the first reflector;

identifying all points where the second reflector intersects the grid; and generating the traveltimes to a third reflector using the intersection points on the second reflector as secondary sources and determining traveltimes from said reflection points on the second reflector to a third reflector by comparing the traveltimes to all points on the third reflector that intersect a vertical grid line from each secondary source on said second reflector and selecting the minimum traveltime from said secondary sources on said second reflector to each intersection point as the true traveltime from the second reflector.

* * * * *